(12) United States Patent
Yao

(10) Patent No.: US 11,640,424 B2
(45) Date of Patent: May 2, 2023

(54) METHODS AND SYSTEMS FOR PROVIDING SEARCHABLE MEDIA CONTENT AND FOR SEARCHING WITHIN MEDIA CONTENT

(71) Applicant: DISH Network L.L.C., Englewood, CO (US)

(72) Inventor: Kevin Yao, Cheyenne, WY (US)

(73) Assignee: DISH Network L.L.C., Englewood, CO (US)

( * ) Notice: Subject to any disclaimer, the term of this patent is extended or adjusted under 35 U.S.C. 154(b) by 234 days.

(21) Appl. No.: 16/996,564

(22) Filed: Aug. 18, 2020

(65) Prior Publication Data

US 2022/0058216 A1 Feb. 24, 2022

(51) Int. Cl.
| | |
|---|---|
| *G06F 16/48* | (2019.01) |
| *G10L 15/26* | (2006.01) |
| *G06F 16/438* | (2019.01) |
| *G06F 16/41* | (2019.01) |
| *G06F 40/123* | (2020.01) |

(52) U.S. Cl.
CPC .............. *G06F 16/48* (2019.01); *G06F 16/41* (2019.01); *G06F 16/438* (2019.01); *G06F 40/123* (2020.01); *G10L 15/26* (2013.01)

(58) Field of Classification Search
CPC ........ G06F 16/48; G06F 16/438; G06F 16/41; G06F 40/123
USPC ......................................................... 707/722
See application file for complete search history.

(56) References Cited

U.S. PATENT DOCUMENTS

| | | | |
|---|---|---|---|
| 10,489,373 B1* | 11/2019 | Alda ...................... | G06F 16/258 |
| 2003/0093580 A1* | 5/2003 | Thomas ............ | H04N 21/44008 |
| | | | 719/318 |
| 2007/0011012 A1* | 1/2007 | Yurick .................... | G10L 15/26 |
| | | | 704/277 |
| 2012/0023084 A1* | 1/2012 | Lalji ...................... | G06F 16/951 |
| | | | 707/706 |
| 2014/0310746 A1* | 10/2014 | Larsen ................... | G06Q 30/02 |
| | | | 725/37 |

* cited by examiner

*Primary Examiner* — Dung K Chau
(74) *Attorney, Agent, or Firm* — KW Law, LLP

(57) ABSTRACT

A method for providing searchable media content includes generating a text file that is representative of an instance of media content. The instance of media content comprises a first scene and a second scene. A first portion of the text file is representative of the first scene and a second portion of the text file is representative of the second scene. The method further includes indexing the first portion with the first scene and indexing the second portion with the second scene.

18 Claims, 7 Drawing Sheets

METHODS AND SYSTEMS FOR PROVIDING SEARCHABLE MEDIA CONTENT AND FOR SEARCHING WITHIN MEDIA CONTENT

TECHNICAL FIELD

The present disclosure generally relates to media systems, and more particularly to methods and systems for providing searchable media content and for searching within media content, which allow a user to search for and access particular audio or video portions within the media content.

BACKGROUND

A consumer of media content may have access to a large selection of sources of such content, such as television programming, internet streaming video, digitally-stored media content such as digital video disks (DVDs), and the like. Such media content may be available from multiple sources and may include scheduled programming, on-demand programming, streaming programming, and recorded programming, among others. Various devices exist that can be used to receive, record, and/or store media content. Devices such as set-top boxes (STBs), personal video recorders (PVRs) and digital video recorders (DVRs), computers, and hand-held devices such as tablets and smartphones, among others, have become commonplace.

A consumer of such media content may encounter a number of difficulties in managing such content. For example, when the media content is an audio/video (A/V) program such as a television show, movie, or internet video, a user may be more interested, or solely interested, in one or more portions of the program, rather than being interested in viewing the entirety of the program. If a user finds, or is desirous of finding, a particular program that may contain certain portions of interest, the user may have no choice but to watch or scroll-through the entire program, waiting for the portions of interest. A user may not know when a portion of interest is to occur during the program, if at all. For example, a user may only be interested in viewing particular features or scenes of the program that are of interest to the user. As such, the user must spend time and effort searching for particular portions of interest within the program.

Typically, a viewer is able access different portions of a program by scrolling forward or backward through the program stream, or by specifying a time to jump to in a stream. Such linear navigation and searching is time-consuming and can involve an unacceptable amount of trial and error. Thus, there is a need for media content management, particularly that provides enhanced searching, which addresses one or more of the foregoing problems in a convenient manner for a user. These and other desirable features and characteristics will become apparent from the subsequent detailed description and the appended claims, taken in conjunction with the accompanying drawings and this background section.

BRIEF SUMMARY

Methods and systems for providing searchable media content, and for searching within such content are disclosed. In accordance with one exemplary embodiment, a method for providing searchable media content includes generating a text file that is representative of an instance of media content. The instance of media content includes a first scene and a second scene. A first portion of the text file is representative of the first scene and a second portion of the text file is representative of the second scene. The method further includes indexing the first portion with a time stamp or time range of the instance of media content associated with the first scene and indexing the second portion with a time stamp or time range of the instance of media content associated with the second scene. Indexing includes associating a time stamp of the instance of media content or a time range of the instance of media content In accordance with another exemplary embodiment, a method for searching within media content includes providing an instance of searchable media content. The instance of searchable media content includes a text file that is representative of the instance of searchable media content. The instance of searchable media content includes a first scene and a second scene. A first portion of the text file is representative of the first scene and a second portion of the text file is representative of the second scene. The first portion is indexed with the first scene and the second portion is indexed with the second scene utilizing time stamps or time ranges of the instance of searchable media content. The method further includes receiving an input from a user indicative of a desired portion of the instance of searchable media content and comparing the input with the text file to determine a matching portion of the text file. The matching portion includes either the first portion or the second portion. Still further, based on the comparing, the method includes outputting either the first scene or the second scene.

In accordance with yet another exemplary embodiment, a system for providing searchable media content includes a processing device configured to generate a text file that is representative of an instance of media content. The instance of media content includes a first scene and a second scene. A first portion of the text file is representative of the first scene and a second portion of the text file is representative of the second scene. The processing device is further configured to index the first portion with a time stamp or time range of the instance of media content associated with the first scene and indexing the second portion with a time stamp or time range of the instance of media content associated with the second scene. The system further includes a non-transitory storage device configured to store the indexed text file.

Additional embodiments could provide other systems, devices, remote devices, media players, software programs, encoders, processes, methods, and/or the like that perform these or other functions. Various embodiments, aspects, and features are described in detail below.

BRIEF DESCRIPTION OF THE DRAWING FIGURES

Exemplary embodiments will hereinafter be described in conjunction with the following drawing figures, wherein like numerals denote like elements, and wherein.

DETAILED DESCRIPTION

Figure 1:
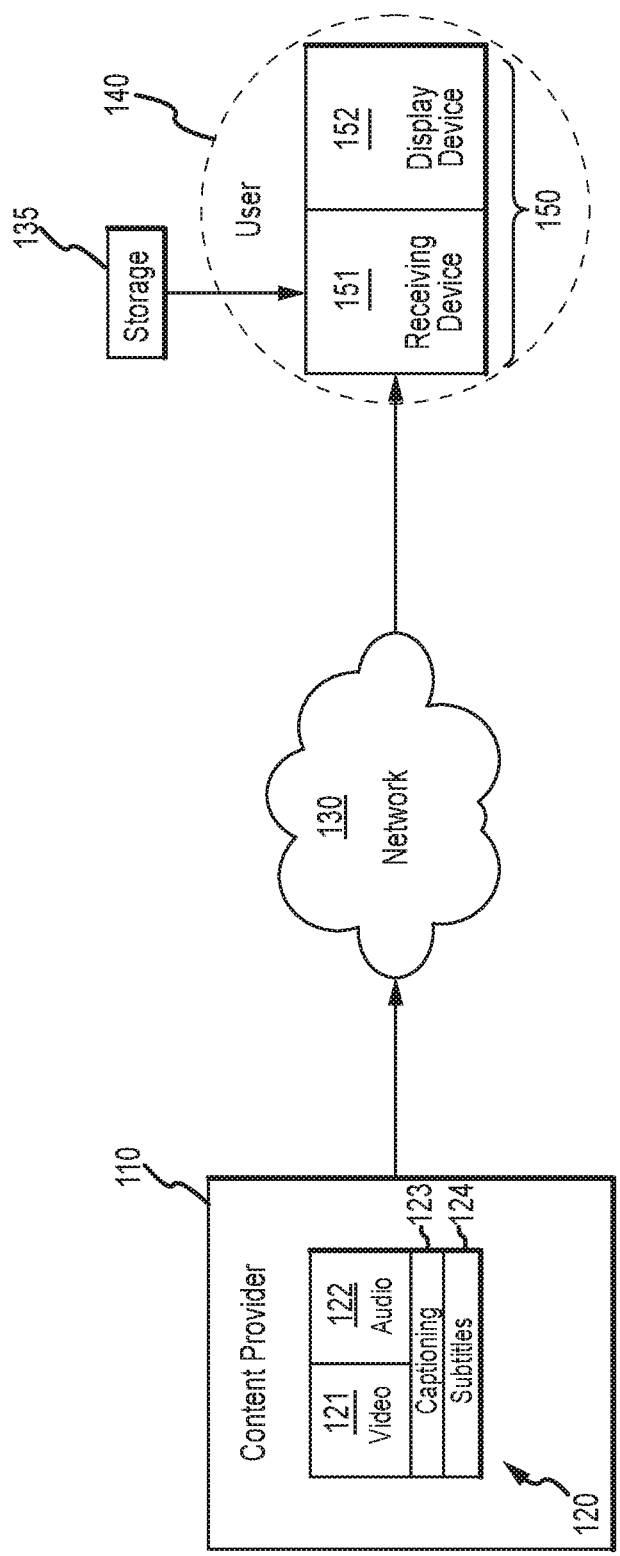
FIG. 1 is system diagram illustrating media content being transmitted from a media content provider to a user's media receiving and displaying devices in accordance with some embodiments.

The following detailed description of the invention is merely exemplary in nature and is not intended to limit the invention or the application and uses of the invention. Furthermore, there is no intention to be bound by any theory presented in the preceding background or the following detailed description.

The present disclosure sets forth various embodiments of methods and systems for providing searchable media content, such as searchable A/V program content, and for searching within such media content. In accordance with the embodiments described herein, a user may consume an A/V program on any media display device, such as a television, computer, hand-held device, or other device configured for presenting media. The user may receive the program at any media receiving device, such as a television set-top box, a DVR/PVR, an internet-based source, a hard disk source, or other device configured for receiving media. The received program may have associated therewith a text file containing text that is representative of either or both of the video content and the audio content of the received program. The text within the text file may be indexed with scenes of the program of which the text is representative, with such indexing being based on a time stamp or a time range of the program. The text stored in the text file may be generated in a variety of manners, including but not limited to generation from closed-captioning metadata associated with the program, generation from subtitle metadata associated with the program, generation from audio/speech recognition of the audio content of the program, generation from image recognition of the objects and background of the video content of the program, generation from a screenplay or a scripts, derived from machine learning, and/or derived from artificial intelligence, among others. The user may search for a particular portion of interest within the program by providing a voice or textual input to the user's media device that is representative of the portion of interest, if the user is generally familiar with the content program. If text within the text file matches the user's voice or textual input, the program may advance or revert to the scene of the program that is indexed with the matching text from the text file. In this manner, the user is able to access a particular portion of interest of the program without the need for cumbersome scrolling or a priori knowledge of a particular time to jump to. In another embodiment, if the user is not familiar with a particular program of interest but instead wishes to perform a more general search, the user may first search for a theme or a category of programming, which may be derived from a summary of the intended media. This summary may, for example, be harvested from an electronic programming guide (EPG), a general website (Internet Movie Database (IMDB), Wikipedia, for example), a library catalog, or a social media reference to the particular theme/category, among others. Once this initial, general search is performed, then the user may be provided with one or more programs from which to initiate a program-level search, as outlined above.

Media Content

In reference to FIG. 1, embodiments of the present disclosure generally relate to searchable media content 120 that is disseminated or transmitted by a media content provider 110. As used herein, the term "media content" generally refers to any instance of media that includes one or both of an audio portion 121 and a video portion 122. In some embodiments, media content may refer to any television program, on demand program, pay-per-view program, broadcast media program, IPTV, internet-streaming program, internet live-feed, commercial, advertisement, video, movie, song, sound, or any segment of these or other forms of media content that may be experienced or viewed.

Media content 120 that includes both an audio portion 121 and a video portion 122 may be referred to herein as an A/V program. The A/V program may be divided into two or more scenes, wherein each such scene has particular audio sounds and particular video images associated therewith. The A/V program may be composed of a chronological sequence of such scenes, with the scenes being associated with a time stamp or time range in reference to the start of the program chronologically forward in time. Examples of A/V programs include but are not limited to television shows, live broadcast events, movies, programs available from various internet platforms, and the like.

Media content, and in particular an A/V program, may have associated therewith various textual metadata. Textual metadata may include, for example, closed captioning 123 and subtitles 124. Closed captioning 123 and subtitling 124 are both processes of displaying text on a media display device that provide additional or interpretive information. Both may be used as a transcription of the audio portion of the A/V program as it occurs (either verbatim or in edited form), sometimes including textual descriptions of non-speech elements. Closed captioning 123 and subtitling 124 may be generated by the provider 110 of the program (such as a movie studio, broadcast network, or internet platform) and may be provided as metadata that accompanies the transmission of the audio and video portions of the program.

Media Receiving and Display Devices

With continued reference to FIG. 1, embodiments of the present disclosure may include the use of media receiving devices 151 that may be configured to receive the media content 120 from any of the aforementioned providers 110, and further may include the use of media display devices 152 that are configured to provide both the video and audio portions of the A/V program to a user 140. The media receiving device 151, in some embodiments, may receive the media content 120 from the media content provider 110 via a network 130. Network 130 generally may include a data transmission means, for example an over-the-air network, satellite network, cable network, streaming media network, or internet network, among others. The media receiving device 151, in other embodiments, may receive the media content 120 from an associated storage device 135 such as a DVR/PVR or DVD. Once received, the media receiving device 151 may process the media content 120 and provide it to the media display device 152 in any suitable format. In this regard, the media display 152 and receiving devices 151 may be operably coupled to one another such that an A/V program received at a receiving device 151 may be transmitted to a display device 152 for presentation to the user 140.

The media receiving devices 151 and media display devices 152, in alternative embodiments, may be configured as an integral unit 150 or as multiple discrete units 151/152. An example of an integral unit 150 is a hand-held device such as a tablet or smartphone that contains in a single unit the equipment and electronics necessary to both receive and display media content. An example of multiple discrete units 151/152 is a television set-top box (as receiving device 151), for example provided by a satellite television service company, that is coupled with a television (as display device 152).

As general matter, the disclosure uses the terms "receiving device" and "set-top-box" to refer to a converter device or electronic equipment that has the capacity to acquire, process and distribute one or more media signals transmitted by broadcast, cable, telephone or satellite distributors. DVR and PVR refer to devices that can record and play back television signals and that may implement "trick" functions including, but not limited to, fast-forward, rewind and pause. DVR and PVR functionality or devices may be combined with a television converter, in embodiments. The signals transmitted by these broadcast, cable, telephone or satellite distributors may include, individually or in any combination, internet, radio, television or telephonic data or information. One skilled in the art will recognize that a television converter device may be implemented as an external self-enclosed unit, a plurality of external self-enclosed units or as an internal unit housed within a television. One skilled in the art will recognize that the present disclosure may apply to analog and digital satellite set-top-boxes.

Figure 2:
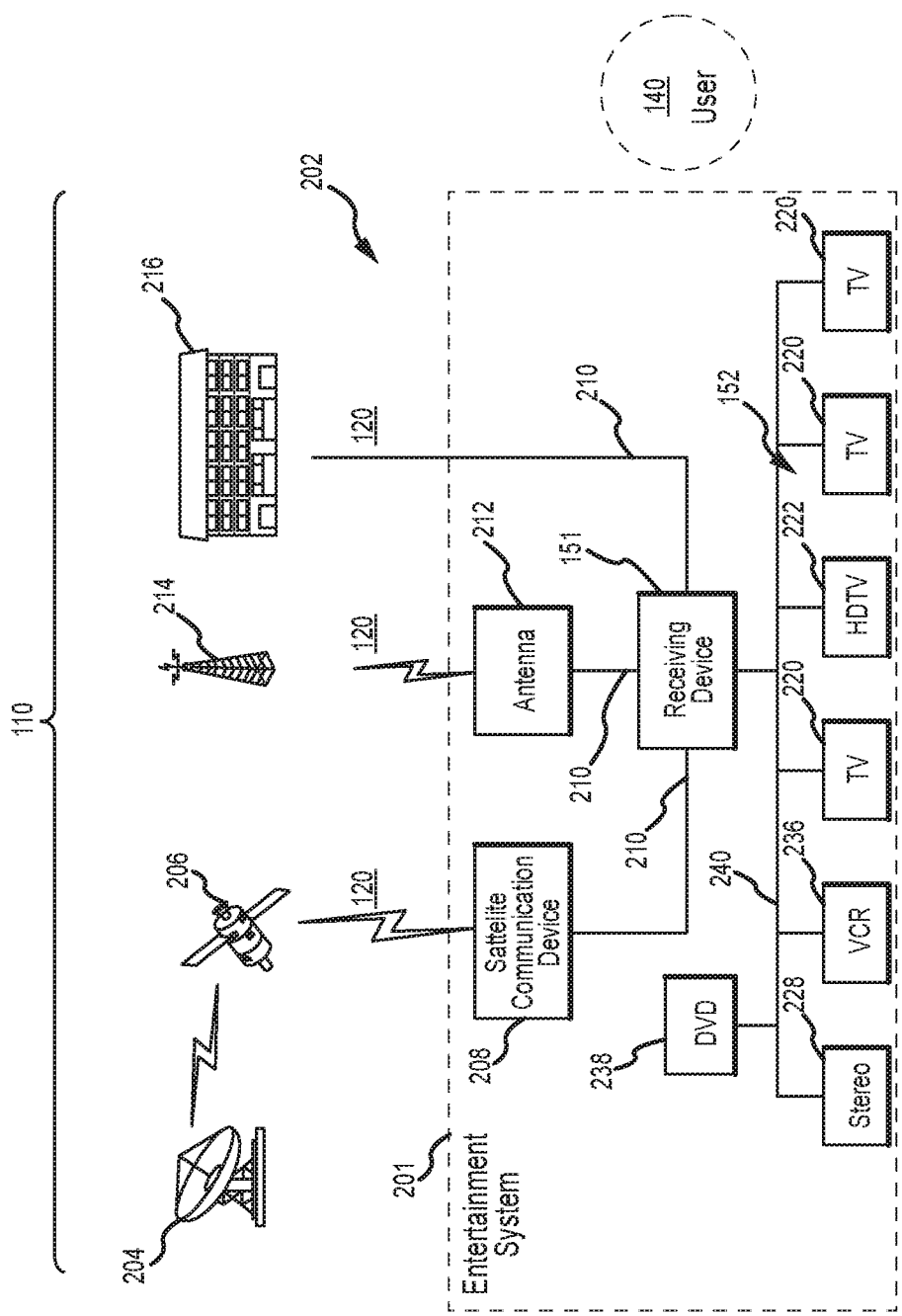
FIG. 2 is a system diagram illustrating a user's entertainment system including media receiving and displaying devices in accordance with some embodiments.

FIG. 2 illustrates an embodiment of an entertainment system 201 that employs the aforementioned set-top box and a television as the receiving device 151 and display device 152, respectively, including, a user's (140) entertainment system 201, and the general environment 202 of the user's (140) location within which system 201 operates, in accordance with embodiments of the present disclosure. As illustrated in FIG. 2, the entertainment system 201 may include a centralized television receiving device 151 that receives and distributes signals from one or more media content providers 110. FIG. 2 shows a generalized embodiment where the receiving device 151 may receive a signal 210 including multiple channels of programming via a wireless content provider 214 (via a connected antenna 212), via a wired or cable content provider 216 (via a direct connection, which may also include an internet connection), or via a satellite content provider 204 (via a satellite 206 and a satellite communication device or antenna 208).

The receiving device 151 as illustrated in FIG. 2 may be connected to any display device 152 for the delivery of media content 120 to the user. The display device 152, in various embodiments, is any device connected to the receiving device 151 that primarily delivers the media content 120 directly to the user 140. These include traditional televisions 220, high definition televisions (HDTVs) 222, computer/monitor combinations, holographic or virtual reality systems (not shown), and/or a stereo 228. Stereo 228 may be any type of primarily audio-only delivery system and may include devices such as a speaker or headphones connected to the receiving device 151 or a digital surround sound home theater system or whole-house audio system.

Although only one is specifically shown, the receiving device 151 may also be connected to several peripheral components ("peripherals"). Examples of peripherals include interactive content devices such as a telephone 230, content capture devices such as a video camera 232 or microphone (not shown), external data storage and playback devices 234 such as a VCR 236 and DVD player 238, and multipurpose devices such as the computer/monitor 224 and further includes a home local area network (LAN) 240 of such devices.

Text File Content

In various embodiments, the received media content 120 (e.g., A/V program) may have associated therewith a text file containing text that is representative of either or both of the video content 121 and the audio content 122 of the program. In some embodiments, the text file may be generated by the media content provider 110 and may be transmitted to the receiving device 151 along with the media content 120. At the media content provider 110, the text file may be generated automatically/electronically or via human input, as will be discussed in greater detail below. In other embodiments, the text file may be generated at the receiving device 151, in which case the text file may be generated automatically/electronically via computer program code stored within the receiving device 151. In either case, the text file may be stored within the receiving device 151 for use in connection with searching the media content 120 in accordance with embodiments of the present disclosure. Alternatively, the text file may be resident at the media content 110 provider, and may be accessible via a network, such as network 130.

Figure 3:
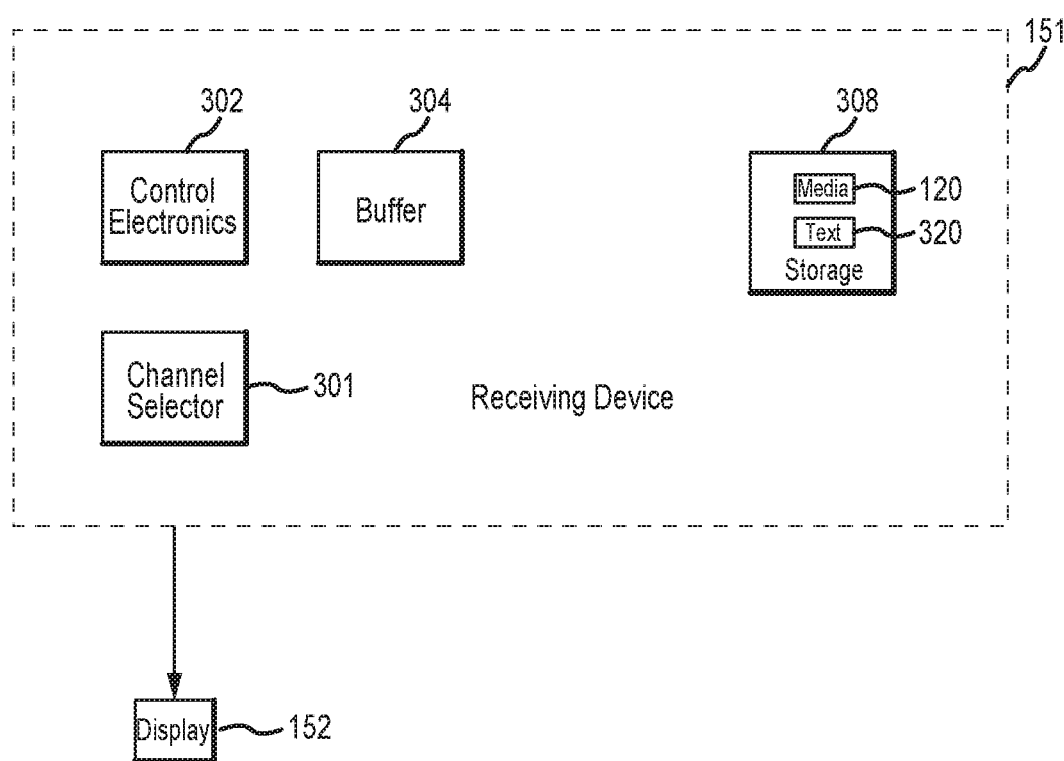
FIG. 3 is a system diagram illustrating a media receiving device in accordance with some embodiments.

FIG. 3 illustrates the components of an exemplary receiving device 151, in some embodiments. In particular, FIG. 3 illustrates some of the logical elements included in a receiving device 151, including a channel selector 301. The term channel selector is used to describe an element that can select a programming stream, commonly referred as a channel, from an input signal containing multiple channels of programming and deliver the selected channel to an attached display device 152. In traditional analog devices, the channel selector 301 is referred to as a tuner and a channel corresponds to a frequency on which an analog television programming stream is modulated. However, with the advent of digital signal transmission, channel selectors 301 may be very different and significantly more complicated than simple analog frequency tuners. Thus, the term channel selector 301 is used herein such that the disclosure applies equally to analog signals and digitally transmitted signals.

FIG. 3 shows that the receiving device 151 may also contain a storage device 308. The storage device 308 is capable of recording and storing media content 120, such as A/V programming, provided by any of the channel selectors 301, and may be embodied as non-transitory memory. The storage device 308 may be further adapted to retrieve stored programming and deliver it to any display device 152 connected to the receiving device 151. Still further, the storage device may be adapted for storing a text file associated with the media content 120. The text file 320 may contain text that is representative of either or both of the video content 121 and the audio content 122 of the media content 120 (A/V program). The text within the text file 320 may be indexed with scenes of the program of which the text is representative, as will be described in greater detail below. In embodiments, the receiving device 151 may also include a least one temporary buffer 304. This buffer may include RAM or may simply be a portion of the storage device 308. The buffer 304 is used to assist in the delivery of programming to the storage device 308 and, in some embodiments, to the connected display device 152.

The receiving device 151 may also include control electronics 302 that control the operation of the channel selector 301 and the other logical elements contained in the receiving device 151, and may be embodied as a processor. One skilled in the art will realize that such control electronics 302 may take many forms, including a combination of hardware, software and firmware, while still providing the functionality described herein. For example, in one embodiment the control electronics 302 may include a general purpose processor running software stored on memory. In another embodiment, the control electronics 302 may include specially designed firmware. In embodiments where the text file 320 is generated automatically/electronically at the receiving device 151, the control electronics 302 may be employed to accomplish this purpose, and may further include hardware/software/firmware for the same.

Figure 4:
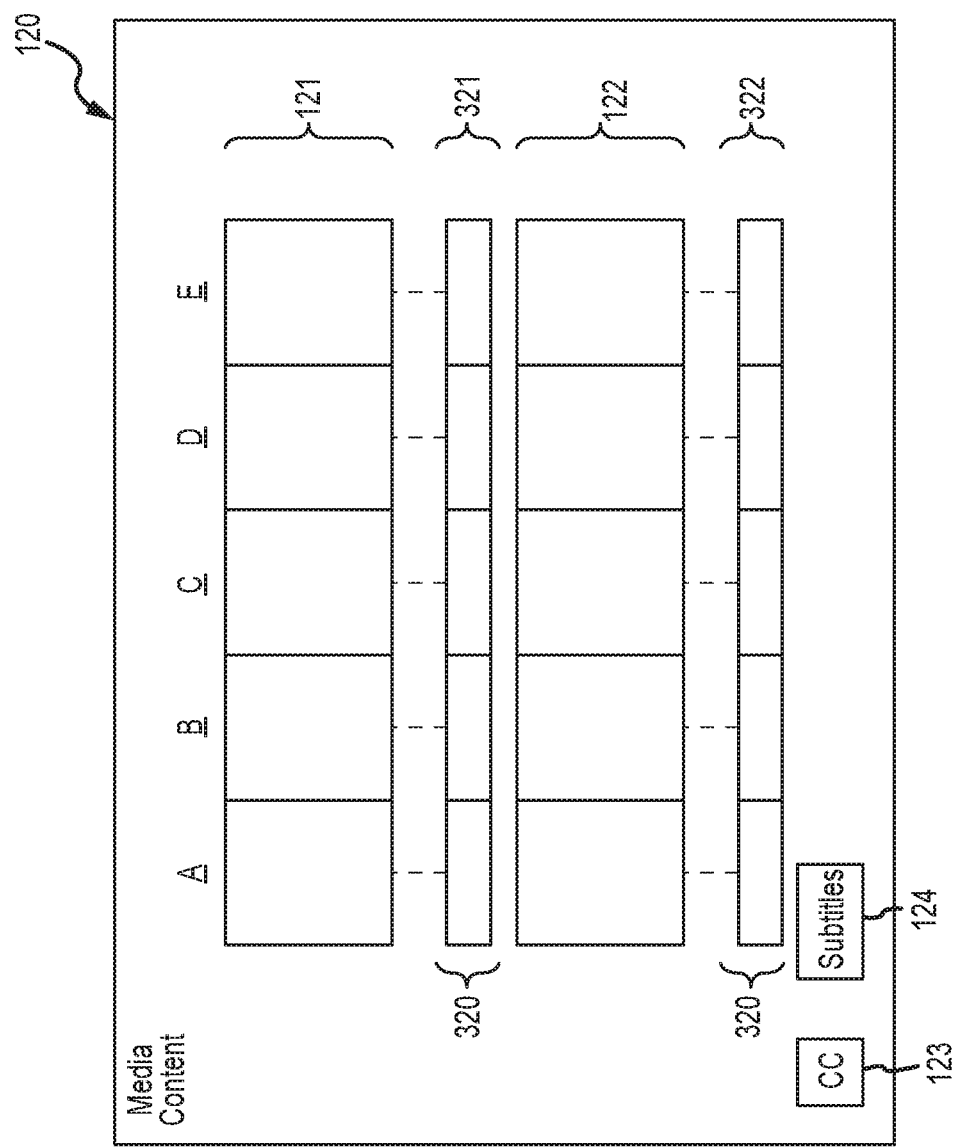
FIG. 4 is an illustration representing media content including a plurality of scenes with video and audio portions in accordance with some embodiments.

As noted above, the text within the text file 320 may be indexed with scenes of the media content 120 of which the text is representative, on the basis of a time stamp or a time range of the media content 120. Accordingly, FIG. 4 provides an exemplary illustration of an embodiment of media content 120, which includes exemplary chronological scenes A, B, C, D, and E (five scenes are shown for illustrative purposes; more or fewer scene may be included in any embodiment). In FIG. 4, blocks 121A-E represent the video portion of each of scenes A-E, and blocks 122A-E represent the audio portion of each of scenes A-E. Text file 320 is illustrated including text 321 that is representative of the video portion 121 and text 322 that is representative of the audio portion 122. As shown, text 321 is indexed by scene, namely text 321A is indexed with video scene 121A, text 321B is indexed with video scene 121B, and so forth to video scene E. Similarly, text 322 is indexed by scene, namely text 322A is indexed with audio scene 122A, text 322B is indexed with audio scene 122B, and so forth to audio scene E.

Text File Generation

The text 321/322 stored in the text file 320 may be generated in a variety of manners, including but not limited to, in various embodiments, generation from closed-captioning metadata 123 associated with the media content 120, generation from subtitle metadata 124 associated with the media content 120, generation from audio/speech recognition of the audio content 121 of the media content 120, and generation from image recognition of the objects and background of the video content 122 of the media content 120, generation from a screenplay or a scripts, derived from machine learning, and/or derived from artificial intelligence, among others. As initially noted above, in some embodiments, the text file 320 may be generated by the media content provider 110 and may be transmitted to the receiving device 151 along with the media content 120. At the media content provider 110, the text file 320 may be generated automatically/electronically or via human input (either from a skilled technician or from crowdsourcing). In other embodiments, the text file may be generated at the receiving device 151, particularly at control electronics 302 in the embodiment of a set-top box (or the processor of a computer or hand-held device in those embodiments), in which case the text file 320 may be generated automatically/electronically via computer program code stored within the receiving device 151/control electronics 302 (or processor).

Closed-captioning metadata 123 and subtitle metadata 124 relate particularly to text 322 that is representative of the audio portion 122. In some embodiments, closed-captioning metadata 123 and subtitle metadata 124 may be generated at or provided by the media content provider 110, and transmitted to the receiving device 151. The control electronics 302 thereof (or processor) may convert the metadata 123/124 to the text 322 of text file 320, and store the text 322 within the storage device 308 for future use in searching. By virtue of the form and purpose of closed-captioning/subtitles, metadata 123/124 is already in text form and is already indexed chronologically with the audio content 122. As such, conversion of the metadata 123/124 to the text 322 of text file 320 is straightforward.

In some embodiments, speech recognition may be performed to generate the text 322 of text file 320 in instances when metadata 123/124 is otherwise not available. In the event that multiple audio tracks are present in multiple languages, separate text files may be produced for each language, with an electronic notation of the language. Speech recognition may be performed at the media content provider and the text file 320 generated therefrom transmitted to the receiving device 151, while in other embodiments speech recognition may be performed at the receiving device 151 using the control electronics 302 (or processor), which may be provided with appropriate software therefor. Various embodiments of speech recognition systems are known in the art and may be used in any embodiment of the present disclosure. For example, some speech recognition systems that are suitable for use herein include circuitry that attempts to digitally simulate the human speech production system by creating acoustical filtering operations that operate on frames of digitally represented sound utterances. Speech recognition systems may include a sound front-end, a hidden Markov model (HMM), and a language syntax back-end. The sound front-end extracts acoustic features of speech. This allows the excitation information of the voiced speech signal and the dynamics of the speech system impulse response to be separately processed. The HMM block functions to determine a most likely utterance from the extracted acoustic features. The language syntax back-end functions to shape the utterances based on language syntax impositions. Other speech recognition systems may be equally suitable for use in embodiments of the present disclosure. Alternatively, human input may be used in place of the speech recognition system, for example a human may manually input text corresponding to the audio portion or it may be derived from crowdsourcing.

In some embodiments, image recognition may be performed to generate the text 321 of text file 320. Image recognition may be performed at the media content provider and the text file 320 generated therefrom transmitted to the receiving device 151, while in other embodiments image recognition may be performed at the receiving device 151 using the control electronics 302 (or processor), which may be provided with appropriate software therefor. Various embodiments of image recognition systems are known in the art and may be used in any embodiment of the present disclosure. In one embodiment, the image recognition system may perform an analysis on an image frame of the video portion 121 of the media content 120 to determine a plurality of edges within the frame to detect a particular shape of an object. In general, edge detection may be accomplished by analyzing the pixels within the frame to detect abrupt color change from one or more pixels to a nearby group of one or more pixels. Through this analysis, the image recognition system may determine the edges of one or more objects within the frame, thereby detecting a general shape of an object within the frame. This general shape may be compared with one or more stored shapes to determine an object displayed within the frame.

In another embodiment, the image recognition system may analyze several frames of the video portion 121 of the media content 120 to detect motion of an object across the display. In this embodiment, one or more points of the object may be detected by the image recognition system within several frames. For example, the image recognition system may detect one or more joints of an animal by analyzing the movements of the animal through several frames. Thus, as the detected points move, the image recognition system may maintain information concerning the movement of the points. Further, the movement of the points may provide information to the image recognition system on the type of object that is moving through the several frames. This information may be compared with one or more stored images to determine the presence of the object in the frame. Other image recognition systems may be equally suitable for use in embodiments of the present disclosure. Alternatively, human input (such as a skilled technician or derived from crowdsourcing) may be used in place of the image recognition system, for example a human may manually input text corresponding to the image portion or it may be derived from crowdsourcing.

Whether generated from closed-captioning metadata 123, subtitle metadata 124, speech recognition, or image recognition, and whether generated at the content provider 110 or at the receiving device 151, all text 321 representing video and all text 322 representing audio may be indexed to the appropriate scene by time stamp or time range, and may be stored as text file 320 within the storage device 308 of receiving device 151. As receiving device 151 may be configured to receive and/or store multiple instances of media content 120, it should also be noted that multiple text files 320 may be stored therein, with each text file 320 further including a pointer to the appropriate instance of media content 120.

Media Content Searching

Figure 5:
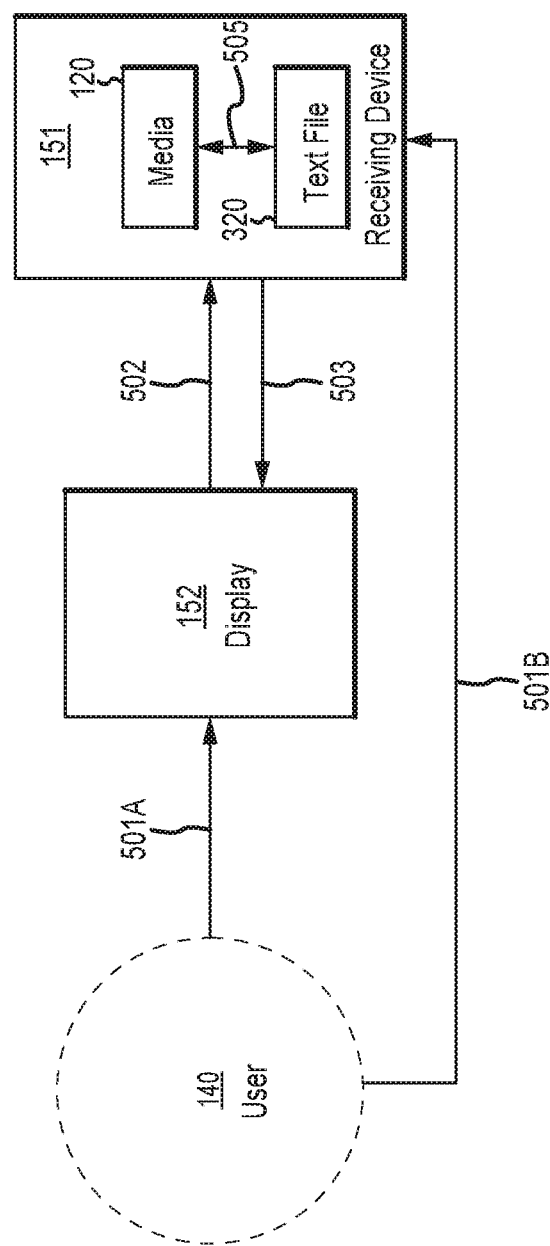
FIG. 5 is a system diagram illustrating user input to a media receiving device for searching media content in accordance with some embodiments.

With reference now to FIG. 5, the user 140 may initiate media content searching by providing an input 501A/501B indicative of the user's desired portion/scene of the media content 120 to the media display device 152 or the media receiving device 151 while the media display device 152 is displaying the media content 120. As noted above, in an alternative embodiment, the user may first initiate a general search on the basis of program category or general program content, after which the particular content searching may be performed in the basis of result(s) provided during the general search. In either embodiment, as shown in FIG. 5, an input 501A may be made to the display device 501A, which then provides a signal 502 indicative of the input 501A to the receiving device 151. Alternatively, an input 501B may be made directly to the receiving device 151. For example, in some embodiments, the user 140 may search for a particular portion of interest within the media content 120 (e.g., A/V program) by providing a voice input to the user's display device 152 or receiving device 151 that is representative of the portion of interest. In other embodiments, the user 140 may search for a particular portion of interest within the media content 120 by providing a textual input to the user's display device 152 or receiving device 151 that is representative of the portion of interest. The user 140 may specify whether the input 501 relates to an audio portion or a video portion of the media content 120. Alternatively, the user 140 need not make such a specification.

The manner by which the user 140 makes the input 501A/501B may depend upon the particular embodiment of media display device 152/receiving device 151 that the user 140 employs to consume the media content 120. For example, in embodiments where a television is employed, the user 140 may utilize a suitable remote control or similar device to make the input to the television directly (501A) or to the receiving device 151 connected to the television (501B). Alternatively, as some televisions are equipped with a microphone, the user 140 may make a verbal utterance directed at the microphone of the television to effect the input 501A. In embodiments wherein a computer is employed, the user 140 may utilize a keyboard or microphone connected to the computer processor to type or speak the input 501B. Further, in embodiments wherein a handheld device such as a tablet or smartphone is employed, the user 140 may utilize a touchscreen keypad or built-in microphone of the handheld device to effect the input (combined 501A/501B). It should be appreciated that in any embodiment where a verbal utterance is made, speech recognition systems, as described above, may be employed to convert the user's speech to a parseable digital format such as text.

With continued reference to FIG. 5, at the media receiving device 151, a comparison 505 is made between the user's input 501A/501B and the text 321/322 of the text file 320. This comparison 505 may be made using appropriate software within the control electronics 302, in the embodiment of a set-top box, or within the processor of a computer or hand-held device. If a match is found between the user's input 501A/501B and any text 321/322, then a determination may be made as to which scene A-E is indexed with the matched text 321/322. Once the determination is made, the scene A-E associated with the matched text 321/322 is provided to the media display device 152 in the form of an appropriate signal 503, and the media display device 152 may display the scene to the user 140. The signal 503 may include a scene other than the scene that was being displayed when the user 140 made the input 501A/501B. If the signal 503 includes a scene that is chronologically behind the scene that was being displayed, then in effect the media content 120 "jumps backward" or reverts to an earlier portion of the media content 120 to display to the user 140. Alternatively, if the signal 503 includes a scene that is chronologically ahead of the scene that was being displayed, then in effect the media content 120 "jumps forward" or advances to a later portion of the media content 120 to display to the user 140. In either case, the user 140 avoids the cumbersome task of scrolling forward/backward to find the desired scene and/or the user does not require a priori knowledge of the timestamp or time range of the desired scene to view it immediately.

Figure 6:
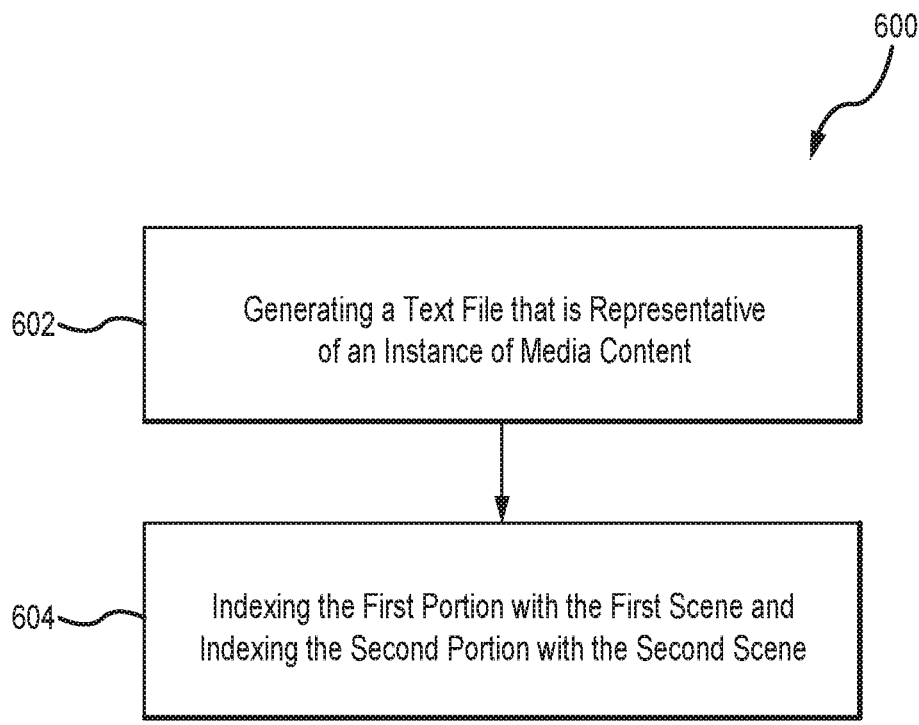
FIG. 6 is flowchart illustrating a method for providing searchable media content in accordance with some embodiments.

As such, FIG. 6 is a flowchart illustrating a method 600 in accordance with the foregoing description of embodiments for providing searchable media content. The method 600 may include a step 602 of generating a text file that is representative of an instance of media content. The instance of media content may include a first scene and a second scene. A first portion of the text file may be representative of the first scene and a second portion of the text file may be representative of the second scene. The method 600 may further include a step 604 of indexing the first portion with the first scene and indexing the second portion with the second scene.

Figure 7:
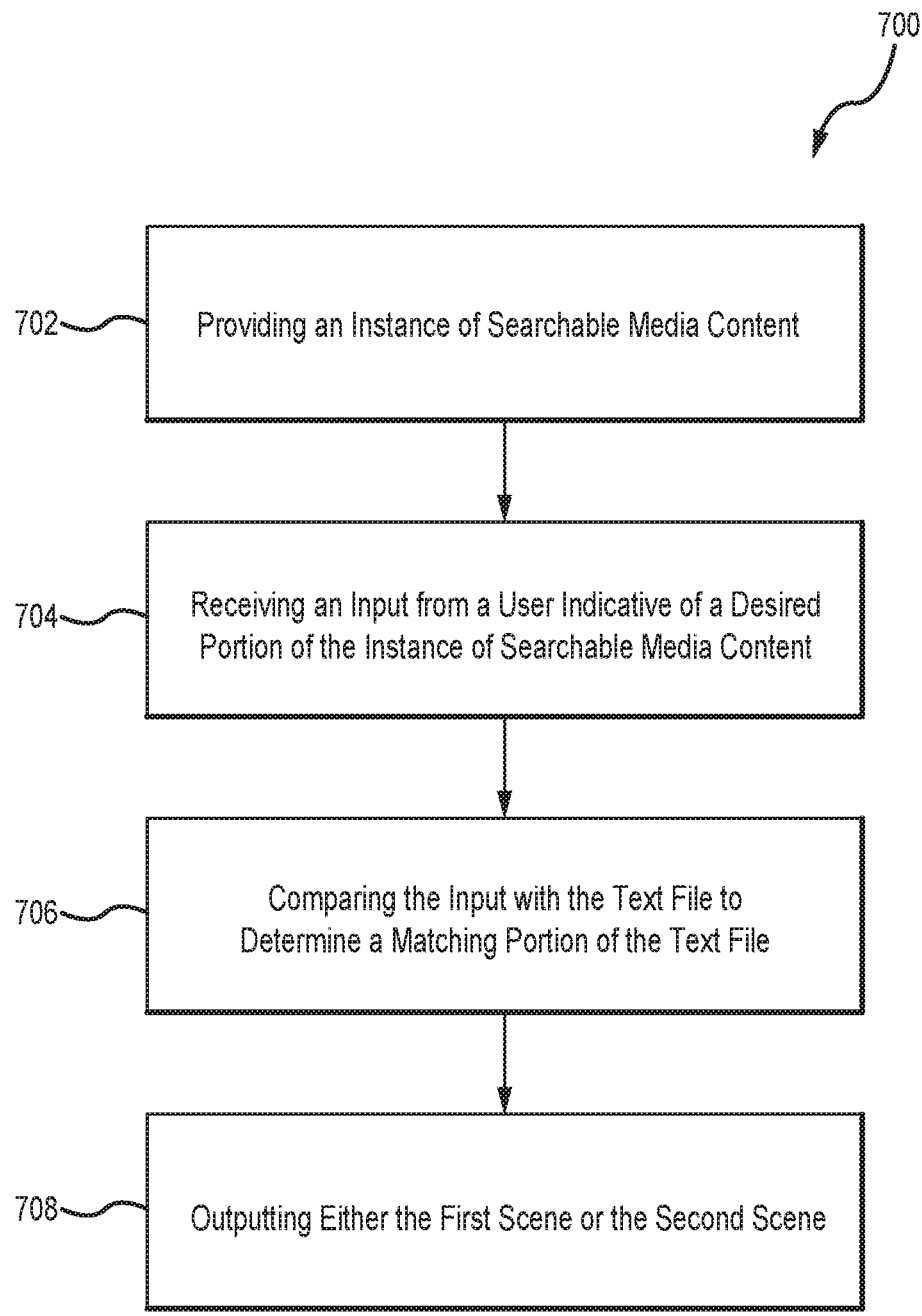
FIG. 7 is a flowchart illustrating a method for searching within searchable media content in accordance with some embodiments.

Furthermore, FIG. 7 is a flowchart illustrating a method 700 in accordance with the foregoing description of embodiments for searching within media content that may include a step 702 of providing an instance of searchable media content. The instance of searchable media content may include a text file that is representative of the instance of searchable media content. The instance of searchable media content may include a first scene and a second scene. A first portion of the text file may be representative of the first scene and a second portion of the text file may be representative of the second scene. The first portion may be indexed with the first scene and the second portion may be indexed with the second scene. The method may further include a step 704 of receiving an input from a user indicative of a desired portion of the instance of searchable media content and a step 706 of comparing the input with the text file to determine a matching portion of the text file. The matching portion may include either the first portion or the second portion. Still further, based on the comparing, the method may include a step 708 of outputting either the first scene or the second scene.

Accordingly, various embodiments of methods and systems for providing searchable media content, such as searchable A/V program content, and for searching within such content, have been described herein. Beneficially, the methods may allow a user to search within an instance of media content based on an input from the user, which is correlated with a text file indexed to the media content and representative of the audio and/or video portions of the media content. The described methods may allow the user to avoid cumbersome scrolling to search for a desired portion of the media content, and further do not require the user to have memorized any timestamp or time range associated with the desired portion. The disclosed methods and systems may generally be employed in connection with any form of audio/video media content and in connection with a wide variety of media receiving and displaying devices, such as televisions/set-top boxes, computers, and hand-held devices (e.g., smartphone or tablets).

The term "exemplary" is used herein to represent one example, instance or illustration that may have any number of alternates. Any implementation described herein as "exemplary" is not necessarily to be construed as preferred or advantageous over other implementations.

While several exemplary embodiments have been presented in the foregoing detailed description, it should be appreciated that a vast number of alternate but equivalent variations exist, and the examples presented herein are not intended to limit the scope, applicability, or configuration of the invention in any way. On the contrary, various changes may be made in the function and arrangement of elements described without departing from the scope of the claims and their legal equivalents. Many other modifications and enhancements could be provided in a wide array of alternate but equivalent embodiments.

What is claimed is:

1. A method for providing searchable media content comprising:
   generating a text file that is representative of an instance of media content, wherein the instance of media content comprises a first scene and a second scene,
      wherein a first portion of the text file includes a first time of the first scene, represents audio in the first scene, and represents video in the first scene,
      wherein a second portion of the text file includes a second time of the second scene, represents audio in the second scene, and represents video in the second scene;
   indexing the first portion with the first scene using the first time and indexing the second portion with the second scene using the second time;
   receiving a search query at a set-top box (STB); and
   playing the instance of media content from the STB starting at the second time in response to the search query matching the second portion of the text file.

2. The method of claim 1, wherein the text file is generated using closed-captioning metadata associated with the instance of media content or using subtitle metadata associate with the instance of media content.

3. The method of claim 1, wherein the text file is generated in a plurality of languages.

4. The method of claim 1, wherein the instance of media content comprises an audio portion, and wherein the text file is generated by performing speech recognition of the audio portion.

5. The method of claim 1, wherein the instance of media content comprises a video portion, and wherein the text file is generated by performing image recognition of the video portion.

6. The method of claim 1, wherein the text file is generated by human input.

7. The method of claim 1, wherein the generating is performed at a media content provider, and further comprising transmitting the instance of media content and the text file from the media content provider to a media receiving device associated with a user.

8. The method of claim 1, wherein the instance of media content originates at a media content provider, and further comprising transmitting the instance of media content from the media content provider to a media receiving device associated with a user, wherein the generating is performed at the media receiving device.

9. The method of claim 1, wherein the instance of media content comprises an audio portion and a video portion, and wherein the text file comprises text representative of the audio portion and text representative of the video portion.

10. The method of claim 1, wherein the instance of media content comprises at least one of a broadcast media program, an on demand program, an internet-streaming program, or a movie.

11. A method for searching within media content comprising:
    providing an instance of searchable media content, wherein the instance of searchable media content comprises a text file that is representative of the instance of searchable media content,
       wherein the instance of searchable media content comprises a first scene and a second scene,
       wherein a first portion of the text file is representative of the first scene and a second portion of the text file is representative of the second scene,
       wherein the first portion of the text file includes a first time of the first scene indexed with the first scene, and
       wherein the second portion of the text file includes a second time of the second scene indexed with the second scene;
    receiving, by a set-top box (STB), an input from a user indicative of a desired portion of the instance of searchable media content;
    matching, by the STB, the input with the second portion of the text file; and
    playing, by the STB, the searchable media content beginning at the second time in response to the second portion of the text file matching the input.

12. The method of claim 11, wherein receiving the input comprises receiving a textual input from a remote control device, a keyboard, or a touchscreen.

13. The method of claim 11, wherein receiving the input comprises receiving a verbal input via a microphone.

14. The method of claim 11, wherein the instance of searchable media content comprises an audio portion and a video portion, and wherein the input comprises an indication of either the audio portion or the video portion.

15. The method of claim 11, wherein providing the instance of searchable media content comprises transmitting the first scene, the second scene, and the text file to a receiving device from a media content provider.

16. A system for providing searchable media content comprising:
- a set-top box (STB) configured to generate a text file that is representative of an instance of media content,
  - wherein the instance of media content comprises a first scene and a second scene,
  - wherein a first portion of the text file is representative of the first scene, and
  - wherein a second portion of the text file is representative of the second scene,
- wherein the first portion of the text file includes a first time of the first scene indexed to the first scene, and
  - wherein the second portion of the text file includes a second time of the second scene indexed to the second scene;
- a non-transitory storage device accessible by the STB and configured to store the text file; and
- a display device in electronic communication with the STB, wherein STB plays the instance of media content on the display device beginning at the second time in response to a search received at the STB matching the second portion of the text file.

17. The system of claim 16, wherein the STB comprises a processing device and the non-transitory storage device, the STB being configured to receive media from a media content provider.

18. The system of claim 16, wherein the non-transitory storage device is associated with the STB, and wherein the STB is configured to receive an input from a user comprising the search indicative of a desired portion of the instance of media content.

* * * * *